US012578780B2

(12) United States Patent
Wang et al.

(10) Patent No.: US 12,578,780 B2
(45) Date of Patent: Mar. 17, 2026

(54) CIRCUIT SLEEP METHOD AND SLEEP CIRCUIT

(71) Applicant: REALTEK SEMICONDUCTOR CORP., Hsinchu (TW)

(72) Inventors: Song Wang, Suzhou (CN); Dong-Yu He, Suzhou (CN); Jian Sun, Suzhou (CN); Hui Li, Suzhou (CN)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 56 days.

(21) Appl. No.: 18/626,619

(22) Filed: Apr. 4, 2024

(65) Prior Publication Data

US 2024/0385677 A1     Nov. 21, 2024

(30) Foreign Application Priority Data

May 16, 2023     (CN) .......................... 202310552326.4

(51) Int. Cl.
*G06F 1/3287*          (2019.01)
*G06F 1/3209*          (2019.01)
(52) U.S. Cl.
CPC .......... *G06F 1/3287* (2013.01); *G06F 1/3209* (2013.01)
(58) Field of Classification Search
CPC .... G06F 1/3287; G06F 1/3209; G06F 1/3275; G06F 9/4418; G06F 11/1068; G06F 11/1448; G06F 11/1456; G06F 11/1469; G06F 2201/84; G06F 11/1466; G06F 11/1461; G06F 21/78; G06F 11/1446; G06F 11/1451; G06F 3/0619; G06F 11/1458; G06F 21/81; G06F 11/1441; G06F 1/3234; Y02D 10/00
See application file for complete search history.

(56) References Cited

U.S. PATENT DOCUMENTS

| | | | | |
|---|---|---|---|---|
| 5,539,879 A * | 7/1996 | Pearce | .................. | G06F 9/4418 714/1 |
| 6,732,319 B2 * | 5/2004 | Holmes | .................... | G11C 7/20 714/764 |
| 8,330,987 B2 * | 12/2012 | Tsukada | ................. | G06K 15/00 358/1.15 |
| 10,725,668 B1 * | 7/2020 | Tang | ..................... | G06F 3/0608 |
| 10,884,977 B1 * | 1/2021 | Shahin | .................. | G06F 16/182 |

(Continued)

*Primary Examiner* — Faisal M Zaman
(74) *Attorney, Agent, or Firm* — Birch, Stewart, Kolasch & Birch, LLP

(57)          ABSTRACT

A circuit sleep method includes: writing all data stored in a memory unit into a current data-backup block and performing a check calculation on the data written into the current data-backup block to obtain a first verification value; powering down the circuit to make the circuit enter a sleep mode; restarting the circuit and determining whether the processing unit has written all the data stored in the memory unit into the current data-backup block before the circuit enters the sleep mode; performing the check calculation on the data stored in the current data-backup block to obtain a second verification value and comparing the first verification value with the second verification value; and writing back the data stored in the current data-backup block to the memory unit in a case that the first verification value and the second verification value are the same.

16 Claims, 4 Drawing Sheets

(56) References Cited

U.S. PATENT DOCUMENTS

| | | | | |
|---|---|---|---|---|
| 2003/0120912 | A1* | 6/2003 | Sasaki | G06F 9/4401 |
| | | | | 713/320 |
| 2004/0172426 | A1* | 9/2004 | Matsui | G06F 11/1458 |
| 2006/0155917 | A1* | 7/2006 | Di Sena | G11C 16/349 |
| | | | | 711/E12.008 |
| 2007/0277051 | A1* | 11/2007 | Reece | G06F 9/4418 |
| | | | | 713/323 |
| 2008/0313505 | A1* | 12/2008 | Lee | G06F 12/0246 |
| | | | | 714/E11.004 |
| 2012/0324299 | A1* | 12/2012 | Moshayedi | G06F 12/0246 |
| | | | | 714/710 |
| 2013/0332791 | A1* | 12/2013 | Chu | G06F 12/0246 |
| | | | | 714/752 |
| 2015/0117107 | A1* | 4/2015 | Sun | G11C 16/225 |
| | | | | 365/185.12 |
| 2016/0291967 | A1* | 10/2016 | Badri | G06F 8/654 |
| 2017/0192715 | A1* | 7/2017 | Wang | G06F 3/0647 |
| 2017/0364282 | A1* | 12/2017 | Margalit | G06F 3/064 |
| 2018/0089015 | A1* | 3/2018 | Branco | G06F 9/4418 |
| 2021/0019181 | A1* | 1/2021 | Zhu | G06F 11/3037 |
| 2021/0216474 | A1* | 7/2021 | Muchherla | G06F 12/0253 |
| 2022/0050926 | A1* | 2/2022 | Golov | G06N 20/00 |
| 2022/0382642 | A1* | 12/2022 | Bhanjois | G06F 11/1451 |
| 2024/0061756 | A1* | 2/2024 | Herington | G06F 11/1458 |
| 2024/0176499 | A1* | 5/2024 | Luo | G06F 3/0616 |

* cited by examiner

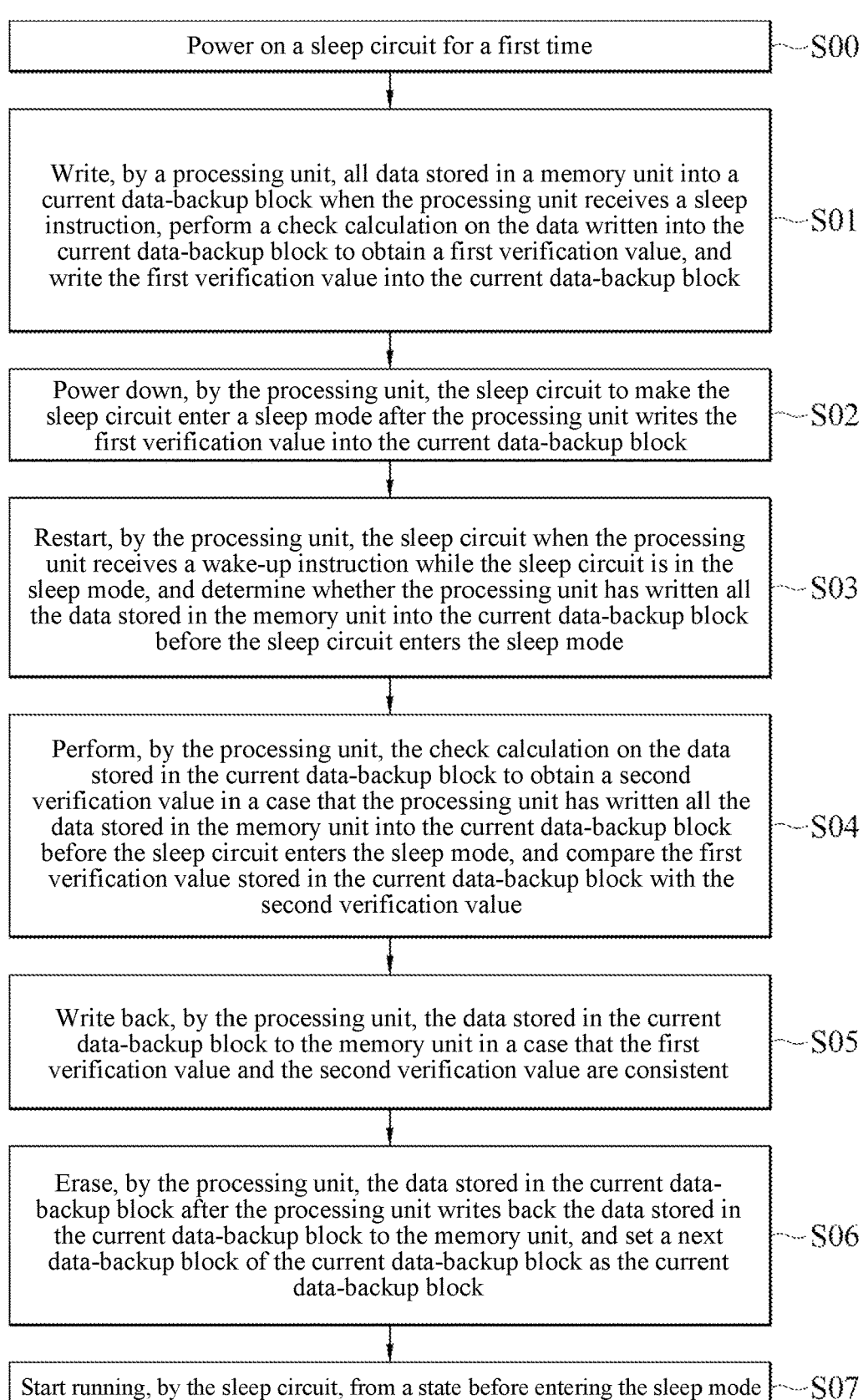

Power on a sleep circuit for a first time —S00

Write, by a processing unit, all data stored in a memory unit into a current data-backup block when the processing unit receives a sleep instruction, perform a check calculation on the data written into the current data-backup block to obtain a first verification value, and write the first verification value into the current data-backup block —S01

Power down, by the processing unit, the sleep circuit to make the sleep circuit enter a sleep mode after the processing unit writes the first verification value into the current data-backup block —S02

Restart, by the processing unit, the sleep circuit when the processing unit receives a wake-up instruction while the sleep circuit is in the sleep mode, and determine whether the processing unit has written all the data stored in the memory unit into the current data-backup block before the sleep circuit enters the sleep mode —S03

Perform, by the processing unit, the check calculation on the data stored in the current data-backup block to obtain a second verification value in a case that the processing unit has written all the data stored in the memory unit into the current data-backup block before the sleep circuit enters the sleep mode, and compare the first verification value stored in the current data-backup block with the second verification value —S04

Write back, by the processing unit, the data stored in the current data-backup block to the memory unit in a case that the first verification value and the second verification value are consistent —S05

Erase, by the processing unit, the data stored in the current data-backup block after the processing unit writes back the data stored in the current data-backup block to the memory unit, and set a next data-backup block of the current data-backup block as the current data-backup block —S06

Start running, by the sleep circuit, from a state before entering the sleep mode —S07

FIG. 2

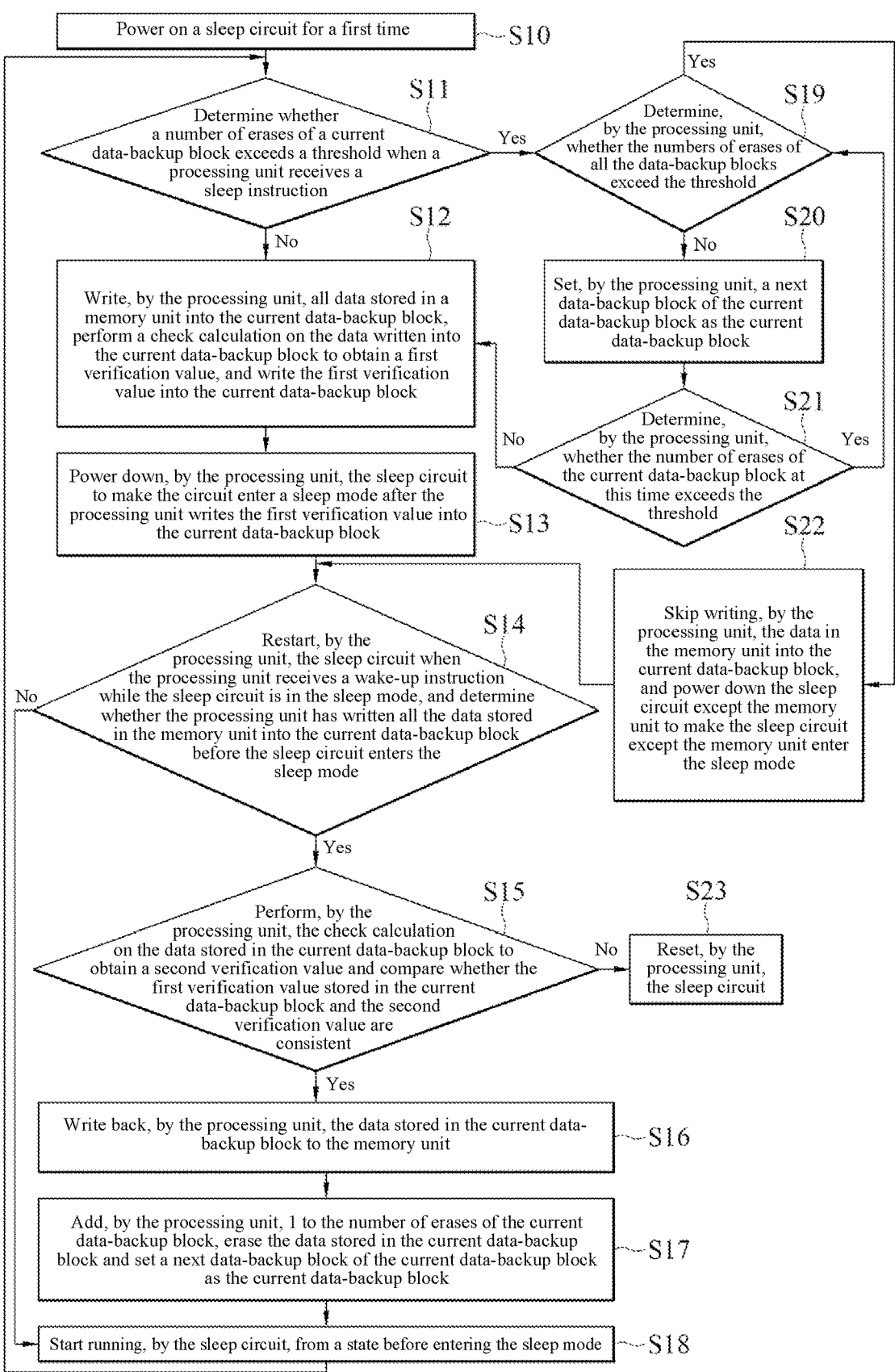

Power on a sleep circuit for a first time — S10

Determine whether a number of erases of a current data-backup block exceeds a threshold when a processing unit receives a sleep instruction — S11

No → S12

Write, by the processing unit, all data stored in a memory unit into the current data-backup block, perform a check calculation on the data written into the current data-backup block to obtain a first verification value, and write the first verification value into the current data-backup block Power down, by the processing unit, the sleep circuit to make the circuit enter a sleep mode after the processing unit writes the first verification value into the current data-backup block — S13

Restart, by the processing unit, the sleep circuit when the processing unit receives a wake-up instruction while the sleep circuit is in the sleep mode, and determine whether the processing unit has written all the data stored in the memory unit into the current data-backup block before the sleep circuit enters the sleep mode — S14

No

Yes

Perform, by the processing unit, the check calculation on the data stored in the current data-backup block to obtain a second verification value and compare whether the first verification value stored in the current data-backup block and the second verification value are consistent — S15

No → Reset, by the processing unit, the sleep circuit — S23

Yes

Write back, by the processing unit, the data stored in the current data-backup block to the memory unit — S16

Add, by the processing unit, 1 to the number of erases of the current data-backup block, erase the data stored in the current data-backup block and set a next data-backup block of the current data-backup block as the current data-backup block — S17

Start running, by the sleep circuit, from a state before entering the sleep mode — S18

Yes

Determine, by the processing unit, whether the numbers of erases of all the data-backup blocks exceed the threshold — S19

No → S20

Set, by the processing unit, a next data-backup block of the current data-backup block as the current data-backup block Determine, by the processing unit, whether the number of erases of the current data-backup block at this time exceeds the threshold — S21

No → Yes

Skip writing, by the processing unit, the data in the memory unit into the current data-backup block, and power down the sleep circuit except the memory unit to make the sleep circuit except the memory unit enter the sleep mode — S22

FIG. 4

CIRCUIT SLEEP METHOD AND SLEEP CIRCUIT

CROSS-REFERENCE TO RELATED APPLICATION

This non-provisional application claims priority under 35 U.S.C. § 119 (a) to patent application No. 202310552326.4 filed in China on May 16, 2023, the entire contents of which are hereby incorporated by reference.

BACKGROUND

Technical Field

The present disclosure relates to a power saving mechanism of a circuit, and in particular, to a circuit sleep method and a sleep circuit.

Related Art

When a microcontroller unit (MCU) system is in a sleep mode, the central processing unit (CPU) and the clock of the system will stop working, and the input port and the output port of the system will be suspended. After the system in the sleep mode is woken up by the wake-up source, the CPU restarts and starts running from the state before the system enters the sleep mode.

However, in order to make the system start running from the state before entering the sleep mode after being woken up, the static random access memory (SRAM) in the system needs to store data of the state before the system enters the sleep mode. As a result, in order to prevent the data stored in the SRAM from being lost during sleep, the system in the sleep mode needs to continuously supply power to the SRAM, which increases the power consumption of the system and further affects the user experience.

SUMMARY

In one embodiment, a circuit sleep method is provided. The circuit includes a processing unit, a memory unit and a flash memory unit. The flash memory unit includes a plurality of data-backup blocks, and one of the plurality of data-backup blocks is a current data-backup block. The sleep method includes: writing, by the processing unit, all data stored in the memory unit into the current data-backup block when the processing unit receives a sleep instruction, performing a check calculation on the data written into the current data-backup block to obtain a first verification value, and writing the first verification value into the current data-backup block; powering down, by the processing unit, the circuit to make the circuit enter a sleep mode after the processing unit writes the first verification value into the current data-backup block; restarting, by the processing unit, the circuit when the processing unit receives a wake-up instruction while the circuit is in the sleep mode, and determining whether the processing unit has written all the data stored in the memory unit into the current data-backup block before the circuit enters the sleep mode; performing, by the processing unit, the check calculation on the data stored in the current data-backup block to obtain a second verification value in a case that the processing unit has written all the data stored in the memory unit into the current data-backup block before the circuit enters the sleep mode, and comparing the first verification value stored in the current data-backup block with the second verification value; writing back, by the processing unit, the data stored in the current data-backup block to the memory unit in a case that the first verification value and the second verification value are consistent; and erasing, by the processing unit, the data stored in the current data-backup block after the processing unit writes back the data stored in the current data-backup block to the memory unit, and setting a next data-backup block of the current data-backup block as the current data-backup block of a next round of the sleep method.

In one embodiment, a circuit sleep method is provided. The circuit includes a processing unit, a memory unit and a flash memory unit. The flash memory unit includes a plurality of data-backup blocks. One of the plurality of data-backup blocks is a current data-backup block, and each of the data-backup blocks records a number of erases. The sleep method includes: determining whether the number of erases of the current data-backup block exceeds a threshold when the processing unit receives a sleep instruction; writing, by the processing unit, all data stored in the memory unit into the current data-backup block in a case that the number of erases of the current data-backup block does not exceed the threshold, performing a check calculation on the data written into the current data-backup block to obtain a first verification value, and writing the first verification value into the current data-backup block; powering down, by the processing unit, the circuit to make the circuit enter a sleep mode after the processing unit writes the first verification value into the current data-backup block; restarting, by the processing unit, the circuit when the processing unit receives a wake-up instruction while the circuit is in the sleep mode, and determining whether the processing unit has written all the data stored in the memory unit into the current data-backup block before the circuit enters the sleep mode; performing, by the processing unit, the check calculation on the data stored in the current data-backup block to obtain a second verification value in a case that the processing unit has written all the data stored in the memory unit into the current data-backup block before the circuit enters the sleep mode, and comparing the first verification value stored in the current data-backup block with the second verification value; writing back, by the processing unit, the data stored in the current data-backup block to the memory unit in a case that the first verification value and the second verification value are consistent; and adding, by the processing unit, 1 to the number of erases of the current data-backup block after the processing unit writes back the data stored in the current data-backup block to the memory unit, erasing the data stored in the current data-backup block, and setting a next data-backup block of the current data-backup block as the current data-backup block of a next round of the sleep method.

In one embodiment, a sleep circuit includes a memory unit, a flash memory unit and a processing unit. The flash memory unit is coupled to the memory unit. The flash memory unit includes a plurality of data-backup blocks. One of the plurality of data-backup blocks is a current data-backup block. The processing unit is coupled to the memory unit and the flash memory unit. The processing unit is configured to write all data stored in the memory unit into the current data-backup block when the processing unit receives a sleep instruction, perform a check calculation on the data written into the current data-backup block to obtain a first verification value, and write the first verification value into the current data-backup block; power down the sleep circuit to make the sleep circuit enter a sleep mode after the processing unit writes the first verification value into the current data-backup block; restart the sleep circuit when the processing unit receives a wake-up instruction while the sleep circuit is in the sleep mode, and determine whether the processing unit has written all the data stored in the memory unit into the current data-backup block before the sleep circuit enters the sleep mode; perform the check calculation on the data stored in the current data-backup block to obtain a second verification value in a case that the processing unit has written all the data stored in the memory unit into the current data-backup block before the sleep circuit enters the sleep mode, and compare the first verification value stored in the current data-backup block with the second verification value; write back the data stored in the current data-backup block to the memory unit in a case that the first verification value and the second verification value are consistent; and erase the data stored in the current data-backup block after the processing unit writes back the data stored in the current data-backup block to the memory unit, and set a next data-backup block of the current data-backup block as the current data-backup block.

In one embodiment, a sleep circuit includes a memory unit, a flash memory unit and a processing unit. The flash memory unit is coupled to the memory unit. The flash memory unit includes a plurality of data-backup blocks. One of the plurality of data-backup blocks is a current data-backup block. The processing unit is coupled to the memory unit and the flash memory unit. The processing unit is configured to write all data stored in the memory unit into the current data-backup block when the processing unit receives a sleep instruction, perform a check calculation on the data written into the current data-backup block to obtain a first verification value, and write the first verification value into the current data-backup block; power down the sleep circuit to make the sleep circuit enter a sleep mode after the processing unit writes the first verification value into the current data-backup block; restart the sleep circuit when the processing unit receives a wake-up instruction while the sleep circuit is in the sleep mode, and determine whether the processing unit has written all the data stored in the memory unit into the current data-backup block before the sleep circuit enters the sleep mode; perform the check calculation on the data stored in the current data-backup block to obtain a second verification value in a case that the processing unit has written all the data stored in the memory unit into the current data-backup block before the sleep circuit enters the sleep mode, and compare the first verification value stored in the current data-backup block with the second verification value; write back the data stored in the current data-backup block to the memory unit in a case that the first verification value and the second verification value are consistent; and erase the data stored in the current data-backup block after the processing unit writes back the data stored in the current data-backup block to the memory unit, and set a next data-backup block of the current data-backup block as the current data-backup block. Each of the data-backup blocks further records a number of erases. The processing unit is further configured to determine whether the number of erases of the current data-backup block exceeds a threshold when the processing unit receives the sleep instruction; write all the data stored in the memory unit into the current data-backup block in a case that the number of erases of the current data-backup block does not exceed the threshold, perform the check calculation on the data written into the current data-backup block to obtain the first verification value, and write the first verification value into the current data-backup block; and add 1 to the number of erases of the current data-backup block after the processing unit writes back the data stored in the current data-backup block to the memory unit, erase the data stored in the current data-backup block, and set the next data-backup block of the current data-backup block as the current data-backup block.

The detailed features and advantages of the present disclosure are set forth in the detailed description of the implementation of the present disclosure, the content of which is sufficient for any person skilled in the art to understand the technical content of the present disclosure and implement it based thereon. According to the contents disclosed in this specification, claims and drawings, any person skilled in the art can easily understand the objectives and advantages associated with the present disclosure.

BRIEF DESCRIPTION OF THE DRAWINGS

FIG. 2 is a flowchart of an embodiment of a circuit sleep method.

FIG. 4 is a flowchart of another embodiment of a circuit sleep method.

DETAILED DESCRIPTION

Figure 1:
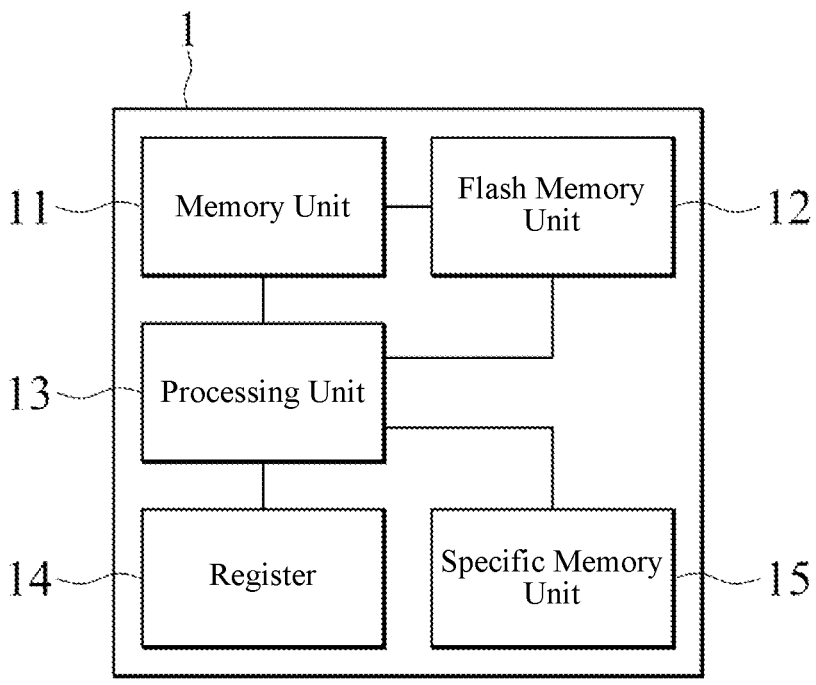
FIG. 1 is a schematic block diagram of an embodiment of a sleep circuit.

FIG. 1 is a schematic block diagram of an embodiment of a sleep circuit 1. Referring to FIG. 1, the sleep circuit 1 includes a memory unit 11, a flash memory unit 12 and a processing unit 13. The memory unit 11 is configured to store data of a state before the sleep circuit 1 enters a sleep mode. The flash memory unit 12 is coupled to the memory unit 11. The processing unit 13 is coupled to the memory unit 11 and the flash memory unit 12. In some embodiments, the memory unit 11 may be, but is not limited to, a volatile storage medium. The volatile storage medium is, for example, a random access memory (RAM), and the RAM is, for example, a static RAM (SRAM) or a dynamic RAM (DRAM). In some embodiments, the flash memory unit 12 may be, but is not limited to, a nonvolatile storage medium in which the stored data will not be lost due to the power-down. The nonvolatile storage medium is, for example, a flash memory, an embedded multimedia card (eMMC), a solid state disk (SSD) or the like. In some embodiments, the processing unit 13 may be, but is not limited to, a central processing unit (CPU).

Figure 3:
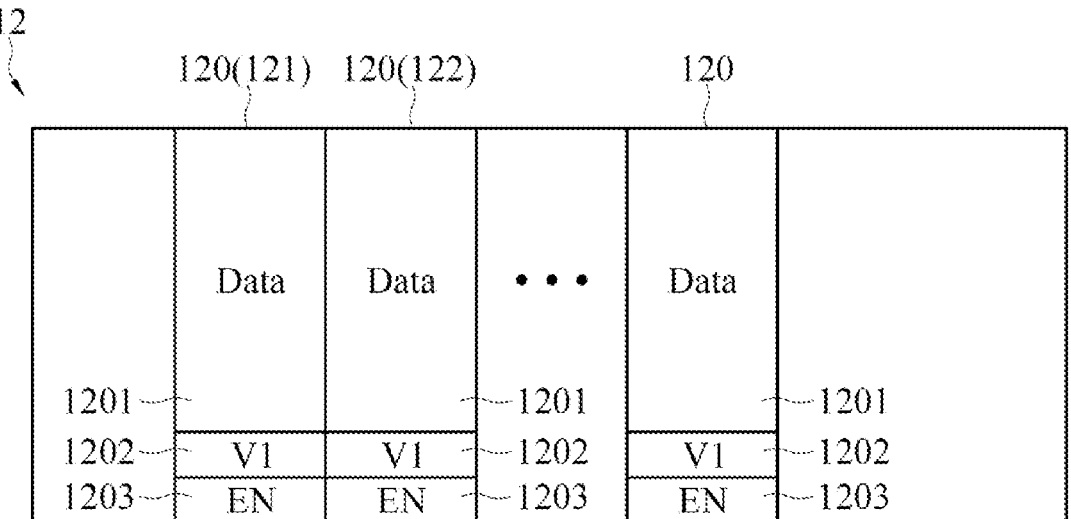
FIG. 3 is a schematic diagram of an embodiment of a flash memory unit.

FIG. 3 is a schematic diagram of an embodiment of the flash memory unit 12. Referring to FIG. 1 and FIG. 3, the flash memory unit 12 includes a plurality of data-backup blocks 120. One of the plurality of data-backup blocks 120 is a current data-backup block.

FIG. 2 is a flowchart of an embodiment of a circuit sleep method. Referring to FIG. 1 to FIG. 3, after the sleep circuit 1 is powered on for a first time (step S00), the processing unit 13 is configured to write all data Data stored in the memory unit 11 into the current data-backup block when receiving a sleep instruction, perform a check calculation on the data Data written into the current data-backup block to obtain a first verification value V1, and write the first verification value V1 into the current data-backup block (step S01). The processing unit 13 powers down the sleep circuit 1 to make the sleep circuit 1 enter a sleep mode after writing the first verification value V1 into the current data-backup block (step S02). The processing unit 13 restarts the sleep circuit 1 when the processing unit 13 receives a wake-up instruction while the sleep circuit 1 is in the sleep mode, and determines whether the processing unit 13 has written all the data Data stored in the memory unit 11 into the current data-backup block before the sleep circuit 1 enters the sleep mode (step S03). The processing unit 13 performs the check calculation on the data Data stored in the current data-backup block to obtain a second verification value in a case that the processing unit 13 has written all the data Data stored in the memory unit 11 into the current data-backup block before the sleep circuit 1 enters the sleep mode, and compares the first verification value V1 stored in the current data-backup block with the second verification value (step S04). The processing unit 13 writes back the data Data stored in the current data-backup block to the memory unit 11 in a case that the first verification value V1 and the second verification value are consistent (step S05). The processing unit 13 erases the data Data stored in the current data-backup block after the processing unit 13 writes back the data Data stored in the current data-backup block to the memory unit 11, and sets a next data-backup block of the current data-backup block as the current data-backup block (step S06). Then, the sleep circuit 1 starts running from the state before entering the sleep mode (step S07), and performs a next round of the sleep method when receiving the sleep instruction again.

The purpose of step S06 is to set the next data-backup block of the current data-backup block as the current data-backup block for the sleep circuit 1 to execute the next round of the sleep method. For example, referring to FIG. 3, if a data-backup block 121 is the current data-backup block of this round of the sleep method, after the processing unit 13 writes back the data Data stored in the data-backup block 121 to the memory unit 11, the processing unit 13 erases the data Data stored in the data-backup block 121 and sets a next data-backup block 122 of the data-backup block 121 as the current data-backup block. If the sleep circuit 1 receives the sleep instruction again and needs to execute the next round of the sleep method, at this time, the data-backup block 122 is the current data-backup block of the next round of the sleep method. In some embodiments, the manner in which the processing unit 13 erases the data Data stored in the current data-backup block is to set all the data stored in the current data-backup block as 1.

In some embodiments, all the data Data in the memory unit 11 and the first verification value V1 are stored in different storage areas in the data-backup block 120. For example, referring to FIG. 3, all the data Data in the memory unit 11 is fixedly stored in a storage area 1201 in the data-backup block 120, and the first verification value V1 is fixedly stored in a storage area 1202 in the data-backup block 120. The storage area 1201 and the storage area 1202 are different storage areas.

In some embodiments, the manner in which the processing unit 13 performs the check calculation on the data Data written into the current data-backup block to obtain the first verification value V1 and performs the check calculation on the data Data stored in the current data-backup block to obtain the second verification value may be, but is not limited to, SHA1 check, SHA256 check or MD5 check.

Since the processing unit 13 has stored, before the sleep circuit 1 enters the sleep mode, all the data Data stored in the memory unit 11 configured to store the data of the state before the sleep circuit 1 enters the sleep mode into the current data-backup block and the data stored in the flash memory unit 12 will not be lost due to the power-down, the data Data can still be completely written back to the memory unit 11 after the completion of the sleep such that the sleep circuit 1 can start running from the state before entering the sleep mode. As a result, the memory unit 11 can be completely powered down during sleep, thereby reducing the power consumption of the sleep circuit 1 during sleep and improving the user experience.

FIG. 4 is a flowchart of another embodiment of a circuit sleep method. Referring to FIG. 1, FIG. 3 and FIG. 4, in some embodiments, each of the data-backup blocks 120 further records a number of erases EN. The processing unit 13 is further configured to determine whether the number of erases EN of the current data-backup block exceeds a threshold when the processing unit receives a sleep instruction (step S11). The processing unit 13 writes all data stored in the memory unit 11 into the current data-backup block in a case that the number of erases EN of the current data-backup block does not exceed the threshold, performs a check calculation on the data Data written into the current data-backup block to obtain a first verification value V1, and writes the first verification value V1 into the current data-backup block (step S12). Moreover, the processing unit 13 adds 1 to the number of erases EN of the current data-backup block after the processing unit 13 writes back the data Data stored in the current data-backup block to the memory unit 11, erases the data Data stored in the current data-backup block, and sets the next data-backup block of the current data-backup block as the current data-backup block (step S17). In some embodiments, the threshold is a value less than a maximum number of erases of the flash memory unit 12. In some embodiments, the maximum number of erases of the flash memory unit 12 may be, but is not limited to, 100000, and the threshold is selected from 90000 to 100000. Step S10 in the embodiment of FIG. 4 corresponds to step S00 in the embodiment of FIG. 2, and step S13 to step S18 in the embodiment of FIG. 4 correspond to step S02 to step S07 in the embodiment of FIG. 2, so that the details will not be repeated here.

In some embodiments, all the data Data in the memory unit 11, the first verification value V1 and the number of erases EN are stored in different storage areas in the data-backup block 120. For example, referring to FIG. 3, all the data Data in the memory unit 11 is fixedly stored in a storage area 1201 in the data-backup block 120, the first verification value V1 is fixedly stored in a storage area 1202 in the data-backup block 120, and the number of erases EN is fixedly stored in a storage area 1203 in the data-backup block 120. The storage area 1201, the storage area 1202 and the storage area 1203 are different storage areas. In some embodiments, the number of erases EN is stored in a tail area of the data-backup block 120.

In order to prevent the current data-backup block from reaching the life limit due to the excessive number of erases EN of the current data-backup block, which further affects the completeness of the data Data stored in the current data-backup block, in some embodiments, the processing unit 13 is further configured to determine whether the numbers of erases of all the data-backup blocks 120 exceed the threshold in a case that the number of erases EN of the current data-backup block exceeds the threshold (step S19). The processing unit 13 sets the next data-backup block of the current data-backup block as the current data-backup block in a case that not all of the numbers of erases of all the data-backup blocks 120 exceed the threshold (step S20), and determines whether the number of erases EN of the current data-backup block at this time exceeds the threshold (step S21). The processing unit 13 writes all data stored in the memory unit 11 into the current data-backup block in a case that the number of erases EN of the current data-backup block at this time does not exceed the threshold, performs a check calculation on the data Data written into the current data-backup block to obtain a first verification value V1, and writes the first verification value V1 into the current data-backup block (step S12). Otherwise, in a case that the number of erases EN of the current data-backup block at this time exceeds the threshold, the processing unit 13 performs step S19 again. For example, referring to FIG. 3, if the data-backup block 121 is the current data-backup block, in a case that the number of erases EN of the data-backup block 121 exceeds the threshold, the processing unit 13 determines whether the numbers of erases of all the data-backup blocks 120 exceed the threshold. If not all of the numbers of erases of all the data-backup blocks 120 exceed the threshold, the processing unit 13 sets the next data-backup block 122 of the data-backup block 121 as the current data-backup block and determines whether the number of erases EN of the data-backup block 122 exceeds the threshold. In a case that the number of erases EN of the current data-backup block 122 does not exceed the threshold, the processing unit 13 writes all the data stored in the memory unit 11 into the data-backup block 122, performs the check calculation on the data Data written into the data-backup block 122 to obtain the first verification value V1, and writes the first verification value V1 into the data-backup block 122. In a case that the number of erases EN of the data-backup block 122 exceeds the threshold, the processing unit 13 determines again whether the numbers of erases of all the data-backup blocks 120 exceed the threshold. If not all of the numbers of erases of all the data-backup blocks 120 exceed the threshold, the processing unit 13 sets a next data-backup block of the data-backup block 122 as the current data-backup block and determines whether the number of erases EN of the current data-backup block at this time exceeds the threshold. This can prevent the processing unit 13 from storing the data Data into the data-backup block 120 that has reached the life limit due to the excessive number of erases EN.

In some embodiments, the processing unit 13 is further configured to skip writing the data Data in the memory unit 11 into the current data-backup block in a case that the numbers of erases EN of all the data-backup blocks 120 exceed the threshold, and power down the sleep circuit 1 except the memory unit 11 to make the sleep circuit 1 except the memory unit 11 enter the sleep mode (step S22). In other words, at this time, the memory unit 11 is continuously powered when the sleep circuit 1 is in the sleep mode. In some embodiments, the case where the processing unit 13 does not write all the data stored in the memory unit 11 into the current data-backup block before the sleep circuit 1 enters the sleep mode is the case where the sleep circuit 1 executes step S22 (i.e., the case where the numbers of erases EN of all the data-backup blocks 120 exceed the threshold).

In some embodiments, in a case that the first verification value V1 and the second verification value are inconsistent, since the memory unit 11 has no data storing the state before the sleep circuit 1 enters the sleep mode due to the power-down and the data stored in the current data-backup block does not pass the check calculation, the processing unit 13 cannot write back the data stored in the current data-backup block to the memory unit 11, so that the sleep circuit cannot start running from the state before entering the sleep mode. At this time, the processing unit 13 is further configured to reset the sleep circuit 1 (step S23). In some embodiments, referring to FIG. 1, the sleep circuit 1 further includes a specific memory unit 15. Before resetting the sleep circuit 1, the processing unit 13 records information of the current data-backup block at this time (i.e., when the first verification value V1 and the second verification value are inconsistent) into the specific memory unit 15. After the reset, every time receiving the sleep instruction, the processing unit 13 checks whether the current data-backup block is the data-backup block whose information has been recorded according to the information recorded in the specific memory unit 15. If so, the processing unit 13 sets the next data-backup block as the current data-backup block. In some embodiments, when receiving the sleep instruction for a first time after the sleep circuit 1 is reset, the processing unit 13 sets the next data-backup block of the data-backup block whose information has been recorded as the current data-backup block according to the information recorded in the specific memory unit 15. In some embodiments, when receiving the sleep instruction after the sleep circuit 1 is reset or powered on for a first time, the processing unit 13 sets the first data-backup block of the flash memory unit 12 as the current data-backup block. In some embodiments, the reason why the first verification value V1 and the second verification value are inconsistent is that the flash memory unit 12 itself is defective or the flash memory unit 12 has suffered unexpected physical damage, for example, due to an impact from an external force, excess operating temperature or invasion of a foreign matter.

In some embodiments, the sleep circuit 1 further includes a register 14. The register 14 stores a backup flag. The processing unit 13 is further configured to set the backup flag as a full value in a case that the processing unit has written all the data Data stored in the memory unit 11 into the current data-backup block.

In some embodiments, the step of determining, by the processing unit 13, whether the processing unit has written all the data Data stored in the memory unit 11 into the current data-backup block before the sleep circuit 1 enters the sleep mode includes: reading the backup flag stored in the register 14, and determining whether the backup flag is a full value. For example, in a case that the processing unit 13 has written all the data Data stored in the memory unit 11 into the current data-backup block, the processing unit 13 sets the backup flag as 1. When the processing unit 13 intends to determine whether all the data Data stored in the memory unit 11 has been written into the current data-backup block before the sleep circuit 1 enters the sleep mode, the processing unit 13 determines whether the backup flag stored in the register 14 is 1. In a case that the backup flag stored in the register 14 is 1, it indicates that the processing unit 13 has written all the data Data stored in the memory unit 11 into the current data-backup block before the sleep circuit 1 enters the sleep mode. In some embodiments, a data size of the backup flag is one bit. Therefore, in some embodiments, the processing unit 13 can determine whether all the data Data stored in the memory unit 11 has been written into the current data-backup block before the sleep circuit 1 enters the sleep mode only by reading the backup flag with the data size of one bit stored in the register 14. The processing unit 13 can determine whether all the data Data stored in the memory unit 11 has been written into the current data-backup block before the sleep circuit 1 enters the sleep mode without reading the data stored in the flash memory unit 12 or making comparison with the data stored in the flash memory unit 12.

In some embodiments, the sleep circuit 1 further includes a register 14. The data-backup block 120 further stores a serial number. The register 14 further stores a backup block record value. The processing unit 13 is further configured to set the backup block record value as the serial number of the current data-backup block in a case that the processing unit has written all the data Data stored in the memory unit 11 into the current data-backup block. For example, if the flash memory unit 12 has 8 data-backup blocks 120, the serial numbers of the 8 data-backup blocks 120 are sequentially 000, 001, 010, 011, 100, 101, 110 and 111. If the current data-backup block is the data-backup block 120 with the serial number 010 in a case that the processing unit 13 has written all the data Data stored in the memory unit 11 into the current data-backup block, the processing unit 13 sets the backup block record value at this time as 010. In some embodiments, the data size of the backup block record value may be, but is not limited to, 3 bits.

In some embodiments, the processing unit 13 writes back the data Data stored in the current data-backup block to the memory unit 11 according to the backup block record value stored in the register 14. For example, in a case that the processing unit 13 determines that all the data Data stored in the memory unit 11 has been written into the current data-backup block before the sleep circuit 1 enters the sleep mode and the first verification value V1 and the second verification value are consistent, if the backup block record value stored in the register 14 at this time is 010, the processing unit 13 writes back the data Data stored in the data-backup block 120 with the serial number 010 to the memory unit 11 according to the backup block record value stored in the register 14.

Based on the above, in some embodiments, since the processing unit 13 has stored all the data Data stored in the memory unit 11 configured to store the data of the state before the sleep circuit 1 enters the sleep mode into the current data-backup block before the sleep circuit 1 enters the sleep mode and the data stored in the flash memory unit 12 will not be lost due to the power-down, the data Data can still be completely written back to the memory unit 11 after the completion of the sleep such that the sleep circuit 1 can start running from the state before entering the sleep mode. As a result, the memory unit 11 can be completely powered down during sleep, thereby reducing the power consumption of the sleep circuit 1 during sleep and improving the user experience. Moreover, the processing unit 13 can compare the number of erases EN of each data-backup block 120 with the threshold, so as to prevent the current data-backup block from reaching the life limit, which further affects the completeness of the data Data stored in the current data-backup block. The processing unit 13 can further determine whether all the data Data stored in the memory unit 11 has been written into the current data-backup block before the sleep circuit 1 enters the sleep mode only by reading the backup flag with the data size of one bit stored in the register 14.

Although the present disclosure has been described in considerable detail with reference to certain preferred embodiments thereof, the disclosure is not for limiting the scope of the invention. Persons having ordinary skill in the art may make various modifications and changes without departing from the scope and spirit of the disclosure. Therefore, the scope of the appended claims should not be limited to the description of the preferred embodiments described above.

What is claimed is:

1. A circuit sleep method, the circuit comprising a processing unit, a memory unit and a flash memory unit, the flash memory unit comprising a plurality of data-backup blocks, and one of the plurality of data-backup blocks being a current data-backup block, and the sleep method comprising:

writing, by the processing unit, all data stored in the memory unit into the current data-backup block when the processing unit receives a sleep instruction, performing a check calculation on the data written into the current data-backup block to obtain a first verification value, and writing the first verification value into the current data-backup block;

powering down, by the processing unit, the circuit to make the circuit enter a sleep mode after the processing unit writes the first verification value into the current data-backup block;

restarting, by the processing unit, the circuit when the processing unit receives a wake-up instruction while the circuit is in the sleep mode, and determining whether the processing unit has written all the data stored in the memory unit into the current data-backup block before the circuit enters the sleep mode;

performing, by the processing unit, the check calculation on the data stored in the current data-backup block to obtain a second verification value in a case that the processing unit has written all the data stored in the memory unit into the current data-backup block before the circuit enters the sleep mode, and comparing the first verification value stored in the current data-backup block with the second verification value;

writing back, by the processing unit, the data stored in the current data-backup block to the memory unit in a case that the first verification value and the second verification value are consistent; and erasing, by the processing unit, the data stored in the current data-backup block after the processing unit writes back the data stored in the current data-backup block to the memory unit, and setting a next data-backup block of the current data-backup block as the current data-backup block of a next round of the sleep method.

2. The sleep method according to claim 1, wherein each of the data-backup blocks further records a number of erases, and the sleep method further comprises:

determining whether the number of erases of the current data-backup block exceeds a threshold when the processing unit receives the sleep instruction;

writing, by the processing unit, all data stored in the memory unit into the current data-backup block in a case that the number of erases of the current data-backup block does not exceed the threshold, performing the check calculation on the data written into the current data-backup block to obtain the first verification value, and writing the first verification value into the current data-backup block; and adding, by the processing unit, 1 to the number of erases of the current data-backup block after the processing unit writes back the data stored in the current data-backup block to the memory unit, erasing the data stored in the current data-backup block, and setting the next data-backup block of the current data-backup block as the current data-backup block of the next round of the sleep method.

3. The sleep method according to claim 2, further comprising:

determining, by the processing unit, whether the numbers of erases of all the data-backup blocks exceed the threshold in a case that the number of erases of the current data-backup block exceeds the threshold, setting the next data-backup block of the current data-backup block as the current data-backup block in a case that not all of the numbers of erases of all the data-backup blocks exceed the threshold, and determining whether the number of erases of the current data-backup block at this time exceeds the threshold.

4. The sleep method according to claim 3, further comprising:

skipping writing, by the processing unit, all the data stored in the memory unit into the current data-backup block in a case that the numbers of erases of all the data-backup blocks exceed the threshold, and powering down the circuit except the memory unit to make the circuit except the memory unit enter the sleep mode.

5. The sleep method according to claim 4, further comprising:

resetting, by the processing unit, the circuit in a case that the first verification value and the second verification value are inconsistent.

6. The sleep method according to claim 5, wherein the circuit further comprises a register storing a backup flag, and the method further comprises:

setting, by the processing unit, the backup flag as a full value in a case that the processing unit has written all the data stored in the memory unit into the current data-backup block.

7. The sleep method according to claim 6, wherein the step of determining, by the processing unit, whether the processing unit has written all the data stored in the memory unit into the current data-backup block before the circuit enters the sleep mode comprises:

reading, by the processing unit, the backup flag stored in the register; and determining, by the processing unit, whether the backup flag is a full value.

8. The sleep method according to claim 7, wherein the threshold is selected from 90000 to 100000.

9. A sleep circuit, comprising:

a memory unit;

a flash memory unit, coupled to the memory unit and comprising a plurality of data-backup blocks, one of the plurality of data-backup blocks being a current data-backup block; and a processing unit, coupled to the memory unit and the flash memory unit, and configured to: write all data stored in the memory unit into the current data-backup block when the processing unit receives a sleep instruction, perform a check calculation on the data written into the current data-backup block to obtain a first verification value, and write the first verification value into the current data-backup block; power down the sleep circuit to make the sleep circuit enter a sleep mode after the processing unit writes the first verification value into the current data-backup block; restart the sleep circuit when the processing unit receives a wake-up instruction while the sleep circuit is in the sleep mode, and determine whether the processing unit has written all the data stored in the memory unit into the current data-backup block before the sleep circuit enters the sleep mode; perform the check calculation on the data stored in the current data-backup block to obtain a second verification value in a case that the processing unit has written all the data stored in the memory unit into the current data-backup block before the sleep circuit enters the sleep mode, and compare the first verification value stored in the current data-backup block with the second verification value; write back the data stored in the current data-backup block to the memory unit in a case that the first verification value and the second verification value are consistent; and erase the data stored in the current data-backup block after the processing unit writes back the data stored in the current data-backup block to the memory unit, and set a next data-backup block of the current data-backup block as the current data-backup block.

10. The sleep circuit according to claim 9, wherein each of the data-backup blocks further records a number of erases, and the processing unit is further configured to: determine whether the number of erases of the current data-backup block exceeds a threshold when the processing unit receives the sleep instruction; write all the data stored in the memory unit into the current data-backup block in a case that the number of erases of the current data-backup block does not exceed the threshold, perform the check calculation on the data written into the current data-backup block to obtain the first verification value, and write the first verification value into the current data-backup block; and add 1 to the number of erases of the current data-backup block after the processing unit writes back the data stored in the current data-backup block to the memory unit, erase the data stored in the current data-backup block, and set the next data-backup block of the current data-backup block as the current data-backup block.

11. The sleep circuit according to claim 10, wherein the processing unit is further configured to determine whether the numbers of erases of all the data-backup blocks exceed the threshold in a case that the number of erases of the current data-backup block exceeds the threshold, set the next data-backup block of the current data-backup block as the current data-backup block in a case that not all of the numbers of erases of all the data-backup blocks exceed the threshold, and determine whether the number of erases of the current data-backup block at this time exceeds the threshold.

12. The sleep circuit according to claim 11, wherein the processing unit is further configured to skip writing all the data in the memory unit into the current data-backup block in a case that the numbers of erases of all the data-backup blocks exceed the threshold, and power down the sleep circuit except the memory unit to make the sleep circuit except the memory unit enter the sleep mode.

13. The sleep circuit according to claim 12, wherein the processing unit is further configured to reset the sleep circuit in a case that the first verification value and the second verification value are inconsistent.

14. The sleep circuit according to claim 13, wherein the sleep circuit further comprises a register coupled to the processing unit and storing a backup flag, and the processing unit is further configured to set the backup flag as a full value in a case that the processing unit writes all the data stored in the memory unit into the current data-backup block.

15. The sleep circuit according to claim 14, wherein the step of determining, by the processing unit, whether the processing unit has written all the data stored in the memory unit into the current data-backup block before the sleep circuit enters the sleep mode comprises:

reading the backup flag stored in the register; and determining whether the backup flag is a full value.

16. The sleep circuit according to claim 15, wherein the threshold is selected from 90000 to 100000.

\* \* \* \* \*